United States Patent
Craig et al.

(10) Patent No.: US 6,915,859 B2
(45) Date of Patent: Jul. 12, 2005

(54) BIOMECHANICALLY-DESIGNED PLASTIC HORSE SHOE

(76) Inventors: Monique Francoise Craig, 6720 Linne Rd., Paso Robles, CA (US) 93446; John James Craig, 6720 Linne Rd., Paso Robles, CA (US) 93446

( * ) Notice: Subject to any disclaimer, the term of this patent is extended or adjusted under 35 U.S.C. 154(b) by 0 days.

(21) Appl. No.: 10/618,949

(22) Filed: Jul. 14, 2003

(65) Prior Publication Data

US 2004/0011536 A1 Jan. 22, 2004

Related U.S. Application Data (60) Provisional application No. 60/398,053, filed on Jul. 22, 2002.

(51) Int. Cl.[7] .............................. A01L 1/04; A01L 7/02
(52) U.S. Cl. ..................... 168/4; 168/14; 168/DIG. 1
(58) Field of Search .............................. 168/4, 14, 17, 168/28, DIG. 1

(56) References Cited

U.S. PATENT DOCUMENTS

| 503,848 | A | | 8/1893 | Hallanan | |
| 561,217 | A | * | 6/1896 | Freyne | 168/4 |
| 705,615 | A | | 7/1902 | Ryan | |
| 1,442,748 | A | | 1/1923 | Trauger | |
| 3,490,536 | A | * | 1/1970 | Hourlier | 168/4 |
| 3,513,915 | A | * | 5/1970 | Sherman | 168/4 |
| 4,420,046 | A | | 12/1983 | Choplin | |
| 4,573,538 | A | * | 3/1986 | Figueras | 168/14 |
| 4,605,071 | A | | 8/1986 | McKibben | |
| 4,892,150 | A | * | 1/1990 | Thoman | 168/4 |
| 5,002,132 | A | * | 3/1991 | Fox et al. | 168/4 |
| 5,566,765 | A | * | 10/1996 | Ovnicek | 168/4 |
| 5,699,861 | A | * | 12/1997 | Sigafoos | 168/17 |
| 6,412,566 | B1 | * | 7/2002 | Rovelli et al. | 168/4 |
| 6,467,548 | B1 | * | 10/2002 | Rynningen | 168/4 |

FOREIGN PATENT DOCUMENTS

GB    2247602 A  *  3/1992  ............. A01L/3/00

OTHER PUBLICATIONS

Search Report, Nov. 17, 2003.

* cited by examiner

*Primary Examiner*—Robert P. Swiatek
(74) *Attorney, Agent, or Firm*—Kaplan & Gilman, LLP (57) ABSTRACT

A horseshoe includes one or more plastic or rubber and other components which can be nailed or glued to an equine hoof, where two different materials, one harder, one softer are used.

9 Claims, 6 Drawing Sheets

BIOMECHANICALLY-DESIGNED PLASTIC HORSE SHOE

CROSS-REFERENCE TO RELATED APPLICATIONS

This application claims the benefit of U.S. Provisional Application No. 60/398,053, filed on 22 Jul. 2002.

BACKGROUND OF THE INVENTION

The present invention relates to a method of protecting the equine hoof, promoting comfort and health thereof, and enhancing the biomechanical performance of the animal. More particularly, the present invention is a horseshoe composed of one or more plastic and other components which can be nailed or glued to the equine hoof.

An animal hoof and especially an equine hoof is composed of a relatively hard outer surface, a sole and other structures on the ground surface of the foot. The outer surface continues to grow during the animal's lifetime (similar to the human fingernail). In the wild, the growth rate of the hoof wall is approximately balanced by the wear processes as the animal moves. However, in a domestic horse, for example, such is not the case. Due to the use we humans make of the horse and the surfaces and conditions they are kept in, some 'artificial' treatment of the hoof is generally required. Most generally, a farrier will trim the hoof and apply a metal shoe to protect the foot. In recent years some non-metal shoes have also been introduced.

When the farrier trims the outer shape of the hoof, a large number of choices can be made concerning what the optimal shape of the hoof might be. Over the years, a great many theories, methodologies, and opinions concerning the best shape of the hoof have been and continue to be espoused. It is generally agreed that various angles, distances, thicknesses, and other measures of the hoof shape dramatically affect the motion, comfort, and, ultimately, health of the animal such as a horse. In perhaps a somewhat typical current practice, a farrier attends to a horse about every 6 weeks. The old shoes are removed, the hoofs are trimmed, and new shoes are placed on the feet.

A typical situation for domestic horse is that the 'toe' portion of the hoof grows out more quickly than the 'heel' portion of the hoof, and hence, without periodic trimming, the angle the foot makes with the ground (as seen from a side view) would gradually change. However, a great variety of other situations concerning the shape and growth of the hoof occur, and it is the job of the farrier, sometimes with a veterinarian's advice, to determine the best course of action to maintain the health and usefulness of the horse.

The shoeing of horses is a practice that dates back hundreds of years. Through most of the history of horse shoeing, materials such as plastic were not available, and so traditionally, steel has been used. Over the past many decades, although plastic has been available, the horse shoeing profession has been slow to adopt the use of plastic shoes. Most (if not all) of the plastic shoes introduced to date emulate the metal shoes closely. That is to say, other than switching to a plastic material, they have attempted to duplicate the function of a metal shoe. The present invention takes advantage of the properties of plastic and other design features to present a better shoe as regards animal comfort, health, and performance.

A number of factors regarding the equine hoof and the horse in nature are important to note. Firstly, the equine hoof is flexible. There is no reason to expect that constraining the hoof's flexibility by attaching it to a rigid metal shoe will promote health and comfort of the animal. Only in rare situations (certain injuries to the foot) would this form of immobilization be recommended. Secondly, in nature the underside ("sole") of the equine hoof is generally packed with dirt in such a way that the weight of the animal is supported not only on the outer hard hoof wall, but also to some extent on the interior "sole" portion of the foot. Hence, the equine research community has come to believe that traditional attempts to bear all weight on the hoof wall, supported on a "rim" style shoe, may be a poor approach as regards long-term animal health, comfort, and performance. Thirdly; it is generally accepted that changes to the exterior shape geometry of the hoof (and shoes or other attachments) can and do affect the motion and static and dynamic weight-bearing of the horse. Traditional shoe designs, and even recent shoe designs, do not adequately take into account the way in which they affect the overall biomechanical functioning of the hoof and animal. In particular, details of the front shape of the shoe have an effect on how the toe "rolls over" or "breaks over" during a locomotion cycle. Fourthly, the ground surface of the shoe is an important consideration—horses need to slip slightly as they locomote, but they cannot slip too much. Just the right amount of stick and slip must be carefully considered. Finally, the method of attachment of the shoe to the foot may adversely affect the animal and must be considered in any shoe design.

Thus, there is a need for a shoe which is somewhat flexible in accordance with the material properties of the natural hoof. There is also a need for a shoe which emulates the sole support found in nature by the fact that dirt generally packs the foot.. There is also a need for a shoe which has a carefully considered geometric shape so as to minimally impact the natural biomechanical function of the animal. There is also a need for a shoe whose traction characteristics are well matched to the horse's motion so that the animal neither falls due to lack of traction, nor suffers undue leg and joint stresses caused by too much traction. Finally, there is a need for a good attachment scheme to attach the shoe to the foot.

Therefore, it would be desirable to have a shoe with several design features meant to address all of these concerns.

SUMMARY OF THE INVENTION

In accordance with one aspect of the present invention, the use of two plastic materials, one harder, one softer, is done in such a way as to carefully modulate the apparent stiffness (aka "durometer") of the shoe at different locations. Namely, the shoe must be relatively hard around its outer rim where it contacts the hoof wall and where nails may optionally be used to attach the shoe. When nails are used with too-soft material, the constant flexing of the material will "work the nails out" over time. Also the portion of the shoe around the perimeter and in contact with the ground towards the toe portion of the foot is exposed to the highest wear pattern. Hence for properties of high resistance to wear, and for the ability to nail, the outer perimeter and ground surface near the toe is comprised of a relatively hard durometer material in our design. In some embodiments, a slightly softer material might be used near the heavy-wear area near the toe, if this improves wear resistance. In contrast, over the portion of the shoe in contact with the interior sole of the foot, a relatively soft material is used in order to avoid any hard pressure points on the sole, while at the same time possibly giving support to the sole. This is an important distinction from other plastic shoes which have appeared in the market: due to plastic being a weaker material than steel, the "web" of the shoe gets wider in typical designs, but this can mean that the hard plastic underlies the sole and may cause soreness in some horses. For this reason, our invention uses hard plastic as needed for structural strength and nail-ability, but uses a softer plastic under the sole. At the heel points of the hoof, some embodiments of our design may layer the relatively harder material with a relatively softer material to achieve an intermediate hardness to provide some cushioning to the heel (which lands first in normal locomotion). From our biomechanical research we feel it is important to support the heel well (not allow too much vertical flexing motion) and yet provide some relatively small amount of cushioning. With manufacturability considerations in mind, as well as the ability of the end-user to "mix and match" different versions of the softer portion, our design is arranged so that the two parts can be made independently and later assembled, or they may be pre-assembled before they are supplied to the end-user.

Note that in some current practice, shoes are applied to the horse's foot with a "pad" placed in between the hoof and the shoe. Between the pad and the hoof a packing material may also be applied. Our invention can be viewed as an alternative to this practice. Our invention allows a similar beneficial treatment to be applied to the horse's feet in an easier and more cost-effective manner, as well as providing other benefits as described herein.

In one embodiment, there may be provided "injection ports" into which a liquid can be injected to fill the voids betweens the sole and the shoe after the shoe has been attached to the foot. One port allows liquid to go in, the other allows air to escape. This feature allows the use of some "hoof packing" materials which are generally two-part mixes which fairly quickly set up to a semi-soft material. The design of the shoe, with a smaller 'central hole' than most other shoes, and with more material under the sole of the hoof, means that less packing material is needed. This is a financial consideration for the user, as the packing materials are, at present, fairly costly.

When liquid fillers are not used a two-part hand-mix silicon-based putty-like material may be applied to the sole just prior to applying the sole. Again the idea is to support the sole, but do it somewhat gently to avoid pressure points.

The shape of the toe portion of the shoe, when viewed in a lateral aspect, consists of a certain angle which promotes an easy biomechanical "roll-over" as the animal moves. If this angle is too steep, the animal tends to 'stub its toe' until eventually the material wears to a less-steep angle. If this angle is too shallow, it's extent reaches too far under the foot and hence good support is not being provided at the toe. Our invention includes a method of calculating the optimal angle, to be described in a following section.

In accordance with one aspect of the present invention, a certain tread pattern and use of the two types of material has been invented. Traction requirements must strike a fine balance. Horses need to slip a little bit, but must not slip too much. The negative consequences of slipping too much are obvious, the negative consequences of too little slip are a bit more subtle, but detrimental nonetheless. If a shoe is too "grippy" and does not allow any slippage on typical ground surfaces, then various reaction torques are transmitted up the animal's leg and cause a twisting motion at the joints. In our own research, the horse's legs have become "puffy" at the joints after a few days on shoes that grip too much. This is a principle reason why a horse shoe can typically not be composed of one soft material—to do so might avoid pressure points on the sole; but would like cause too much grip to the ground and result in undue stress on joints. Our invention includes a tread pattern to resist slipping in lateral directions, but which allows rotational (about the approximate center of the shoe) slipping somewhat easier. This is accomplished by a radially-oriented tread pattern consisted of tread-elements which present a longer cross-section to lateral movements than they do to rotational movements. Finally, the shoe design incorporates elements which allow the addition of "grips" which may be required for certain uses of the horse on certain surfaces (i.e. jumping on a grass surface).

In a most preferred embodiment, there is provided a method and system for attaching the shoe to the foot using glue. While the present invention can be attached with nails (as with the majority of current horse shoes) a preferred embodiment has design features specifically meant to make the shoe gluable to the foot. The features related to making the shoe able to be glued are:

In some embodiments of the invention, fabric "side flaps" are present that emerge from an interior spot on the "sole side" of the shoe, lie across the top surface of the shoe, and then are glued on the side-walls of the hoof. The location of these side-flaps may be near or behind the widest portion of the foot, or they could be selected to be forward of the widest portion of the foot. This differs from other systems that wrap material around the toe. An important and unique feature of how this fabric is attached to the shoe is that it emerges from the shoe's central portion, not from the edge of the shoe. In a plastic shoe, which cannot be molded or bent into shape at the time of application, one must typically grind the shoe at various points along it's edges to make it fit the horse's foot. To allow this re-shaping the fabric cannot emerge from the edge of the shoe. In the present invention, the fabric can easily be held aside while any portion of the periphery of the shoe is grinded to remove some material to promote a good foot with a given animal.

The portion of the top surface of the shoe which will be glued is given a rough finish or other pattern to promote good adhesion with glue.

In some embodiments of the invention, on the portion of the top surface of the shoe which will be glued, there are very small plastic elements called "stand-offs" whose purpose is to ensure a uniform and appropriately size glue layer between shoe and hoof. With the aid of these standoffs, the shoe can be pressed against the hoof, and excess glue will squeeze out the sides, resulting in a uniform glue layer. Without such contrivances, it is quite possible to squeeze out too much glue, or squeeze out more on one side than the other, leading to a mis-aligned shoe. These stand-offs are easily removed (with a farrier's rasp) in case the shoe is to be applied with nails.

The material the hard-part of the shoe is made from is selected so that it is bondable with currently available glues. For example, plastics of the Polyolefin family are not readily bondable with adhesives and so would not be appropriate choices.

In another aspect of the present invention, there is provided a hole in the center of the shoe which can either be filled with a packing, or left open. In some climates, or according to the wishes of some horse owners, this hole can be left open to promote air flow to the sole of the foot. In this case, the optional "injection ports" may provide the feature of additional air-flow into the sole. Yet the particular shape of the central hole (somewhat "heart" shaped) is a design feature meant to provide good support to the 'frog' portion of the horse's foot. By this method; even when packing is not used with the shoe, reasonable support (better than with current start-of-the-art shoes) is provided. In some embodiments of the present invention, the shoe will be fabricated with no central hole at all.

DETAILED DESCRIPTION OF THE INVENTION

Figure 1:
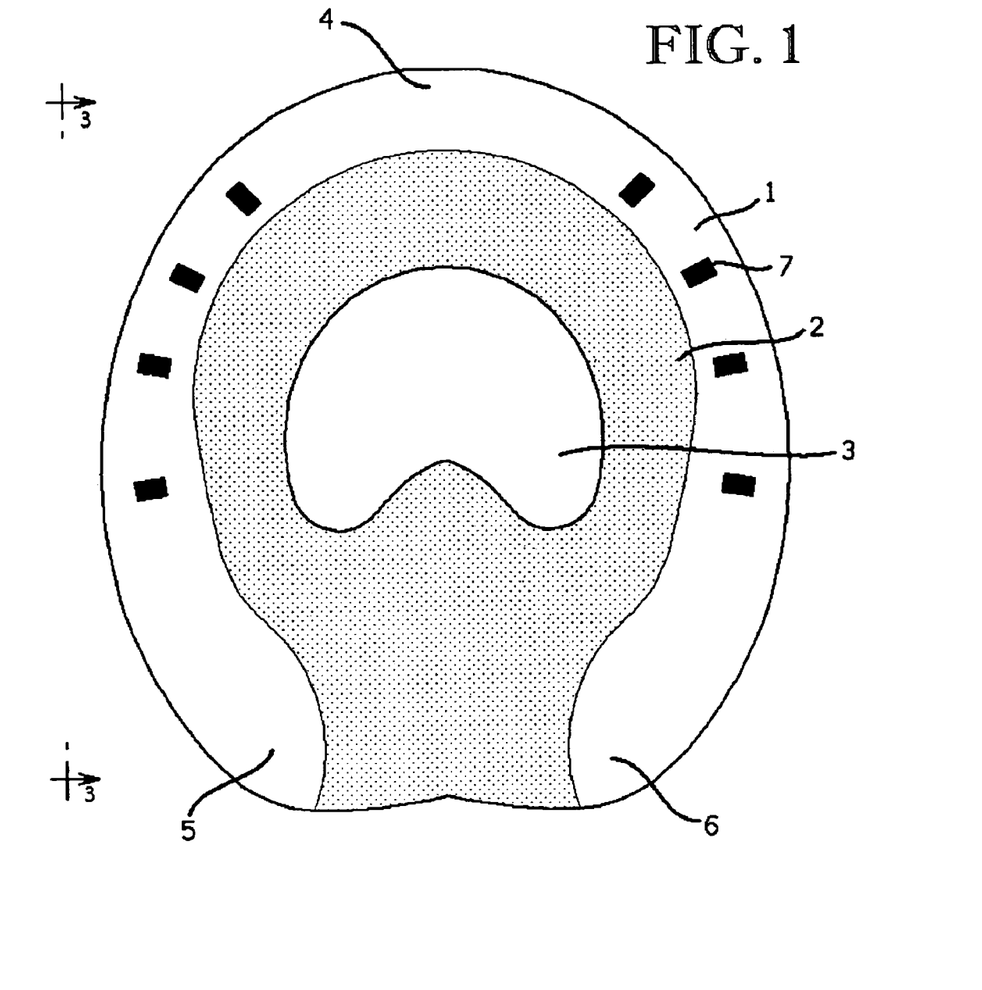
FIG. 1 is a diagram of the "hoof side" or "sole side" of one embodiment of the invention.

FIG. 1 shows an example of the embodiment of the invention viewed from the "sole-side" of the shoe. The harder material 1 forms the outer rim of the shoe, with the softer material 2 in the interior of the shoe where it may contact the sole of the animal's foot. This is central to our invention: by this method we make a plastic shoe structurally strong enough, yet avoiding hard plastic in the area of the sole of the horse which might cause bruising or discomfort. In contrast, if the entire shoe were to be made of a soft enough material to avoid bruising or discomfort, then the entire shoe would lack the rigidity needed, and may as well exhibit other problems arising when nails are used to secure the shoe. This particular use of materials of two different "durometer" (a measure of stiffness) and "flexural modulus" (a measure of resistance to bending) is the central point of our invention. In other words, the harder material 1 has a lower resilience as compared to the softer material 2. The more resilient material 2 contacts the sole of the animal's foot (which may include the caudal portion) for comfort and support. Note that in some embodiments, it may be possible to achieve this concept from a single material type. In this case, by use of geometric shaping of the material on the interior surface of the sole-side of the shoe, it's apparent stiffness is made less than the material of the outer rim. This is done by forming voids and/or undercuts in the material to make it more flexible as needed. The "central hole" 3 provides some air-flow to the hoof. The harder material forms a traditional "horseshoe shape" from the toe region 4 back around to the region of the heels 5,6. A set of holes 7 are provided for nailing.

Figure 2:
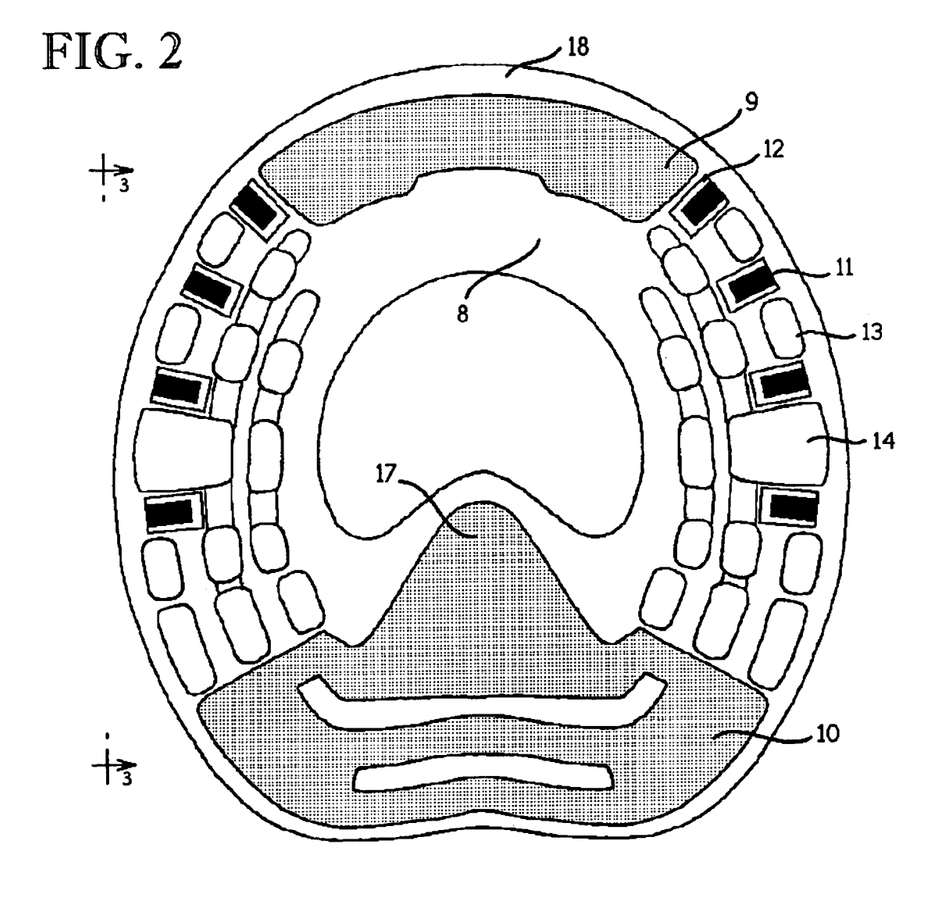
FIG. 2 is a diagram of the "ground side" of one embodiment of the invention.

FIG. 2 shows an example of the embodiment of the tread pattern. Note the tread pattern 13 is such that it presents a longer "edge" (and more traction) to a front-to-back or side-to-side sliding motion than to a rotary motion about the center of the shoe. This is to allow the horse to slip rotationally more easily than to slip laterally. The 4 rectangle shaped indents 11 on either side of the shoe are the nailing holes. There are depressions 12 about halfway through the thickness of the shoe which will capture the heads of the nails that are driven there. The long dimension of the nailing hole 11 allows for proper selection of nail placement along this length. The harder plastic material through which the nails are driven is also clear or semi-clear so the farrier can see through the shoe to determine where to place the nail. The larger tread pattern 9, 10, 14 (e.g. near the back or heel-area) are sites where "studs" or other additional traction devices can be mounted on the shoe. Such devices are currently commercially available. The somewhat large tread pattern 9 at the toe end of the shoe may be enhanced with the addition of small metal parts to aid in traction and/or resistance to wear. It is also possible that the material in the toe portion of the tread (where generally the most severe wear occurs) may be modulated in hardness as needed to achieve a better wear characteristic. Note the harder material 8 forms the structure of the shoe and supports the softer material on the other side (sole-side) of the shoe. The shape of the shoe 17 provides support under the "frog" of the hoof. The shoe has a bevel at the toe 18.

Figure 3:
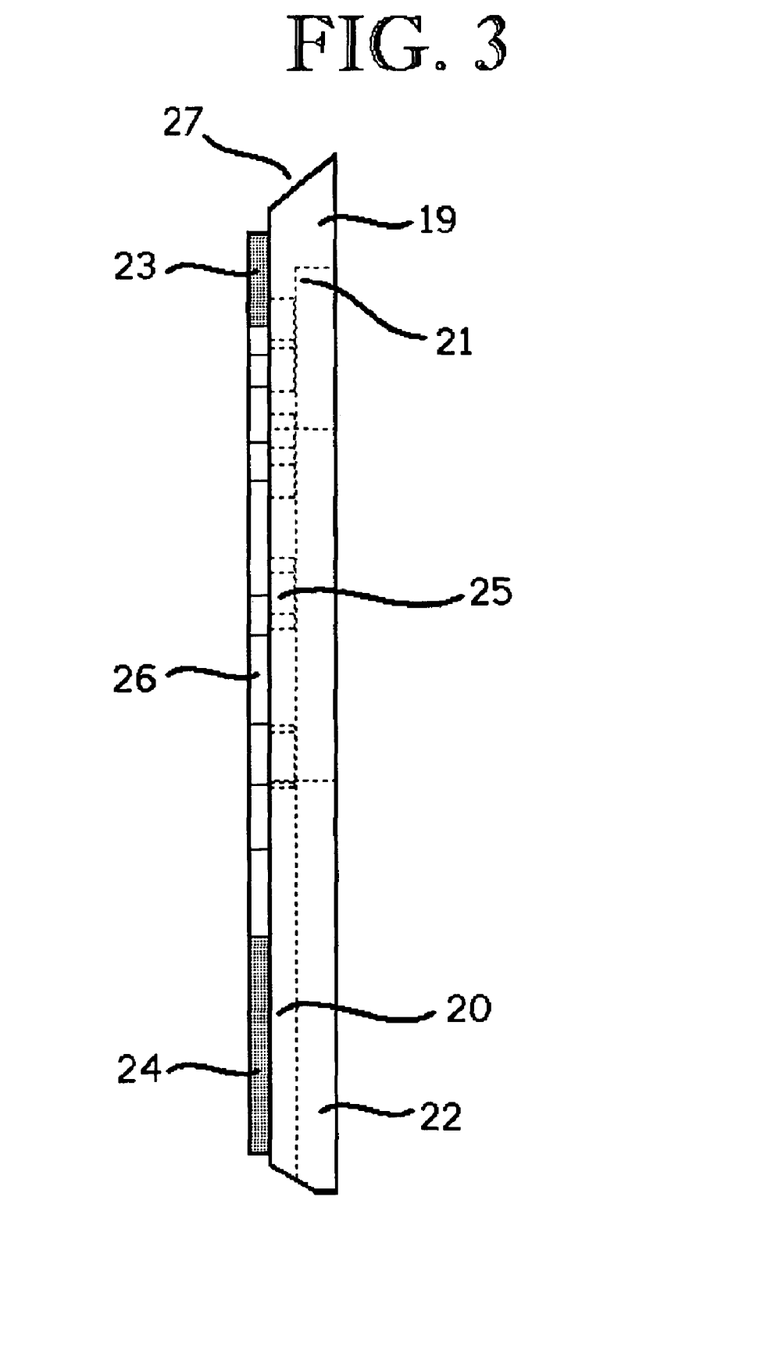
FIG. 3 is a diagram of the one embodiment of the invention viewed from the side.

FIG. 3 shows an embodiment of the invention from the lateral aspect. In this diagram, dashed lines indicate the nail-hole areas 25, the depth of the softer "pad" on the sole side 21, 22, and how the central hole goes all the way through the shoe. In some embodiments, this central hole may be absent thus forming a totally closed shoe. The hard material 19, 20 forms the main structure of the shoe. The large tread elements at the toe 23 and at the heel 24 may optionally be of a different material for wear or for shock absorption. The tread elements 26 contact the ground.

FIG. 3 also shows the angle 27 formed by the shoe at the toe of the shoe. This angle has been computed based on biomechanical principles. While this angle might be adjusted for each individual horse, there is enough commonality in size of the biomechanical structures that for a given size of shoe, a fixed value for this angle will benefit most horses. If this angle is too steep, the animal tends to 'stub its toe' until eventually the material wears to a less-steep angle. If this angle is too shallow, it's extent reaches too far under the foot and hence good support is not being provided at the toe. Our method to compute the optimal angle is as follows. When the animal locomotes, joints in the leg are rotating. If we consider the most distal two joints (known as the "pastern joint" and the "coffin joint") we can locate their biomechanical centers of rotation. Because these joints rotate together, one can approximate their action with a single "virtual center" of rotation which lies on the line segment which connects the two joints' centers of rotation. Since the pastern joint rotates only about 1/7 as much as the coffin joint (in our research) this combined virtual center of rotation lies 1/7 of the way from the coffin joint's center to the pastern joint's center. From this virtual center point, if one considers the "lever arm" out to the toe point, someone versed in elementary planar mechanics can conclude that to minimally impact the toe-force to tendon-force relationship, a certain angle at the toe should be present (namely, such that the angled surface of the shoe is perpendicular to the line connecting the virtual center of rotation and the tip of the toe). The final detail is that one needs to consider the location (relative to the toe) of the virtual rotation center at the instant of "roll over". From research texts one can find typical values of the coffin joint angle at this point in locomotion, meaning that at this point the virtual center has moved slightly forward from its normal rest position.

Figure 4:
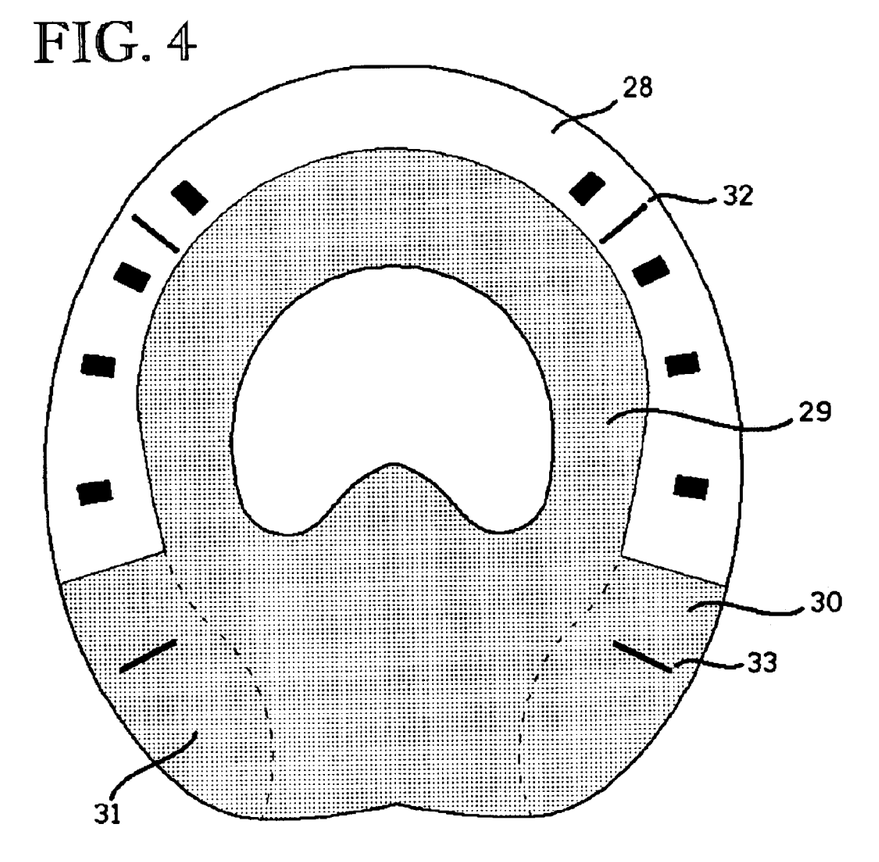
FIG. 4 is a diagram of the one embodiment of the invention. In this case, the shoe is meant for application by gluing, hence, stand-offs have been added to ensure a uniform glue layer thickness. Also shown in this figure is an optional layer of softer material spreading over the heel portion of the shoe to provide some cushioning there.

FIG. 4 shows the portion of the "sole-side" of the shoe which may have a roughened surface so that good glue adhesion will occur. The harder material 28 and the softer material 29 appear as before. Also indicated are the small "stand-offs" 32, 33 that ensure a uniform glue layer when the shoe is glued. This figure also shows how the softer material may optionally "wing out" in a thin layer over the heels 30, 31 to provide some cushioning there. In variations on this embodiment, the thickness of the softer layer at the heel can be varied to trade off heel cushioning (a good things versus heel motion in the vertical direction (probably a bad thing).

Figure 5:
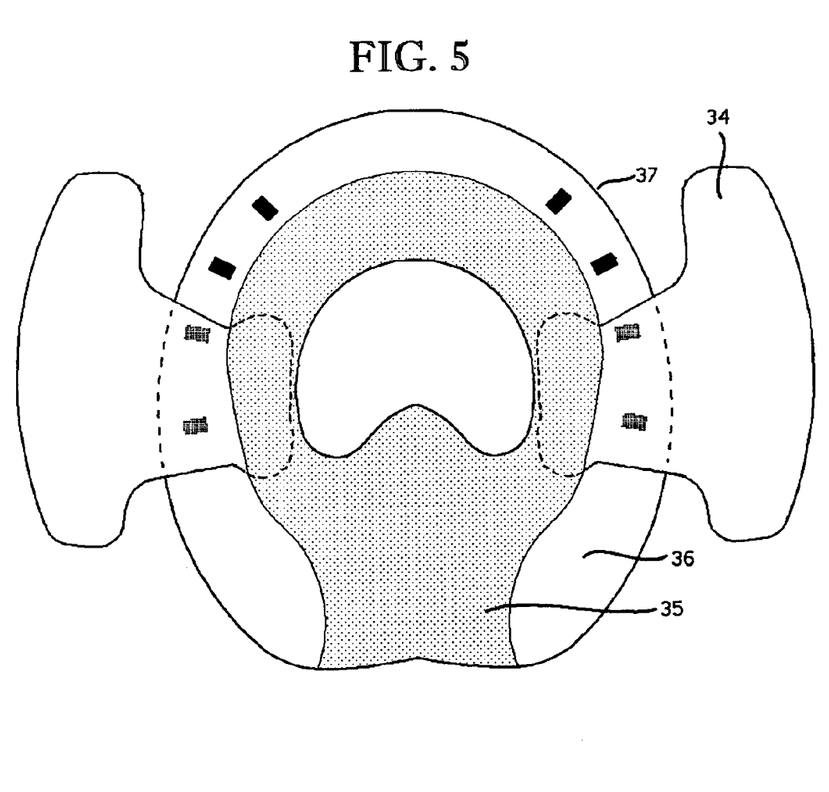
FIG. 5 is a diagram of one embodiment of the invention which shows the integrated "side flaps" which are attached to the shoe.
Figure 6:
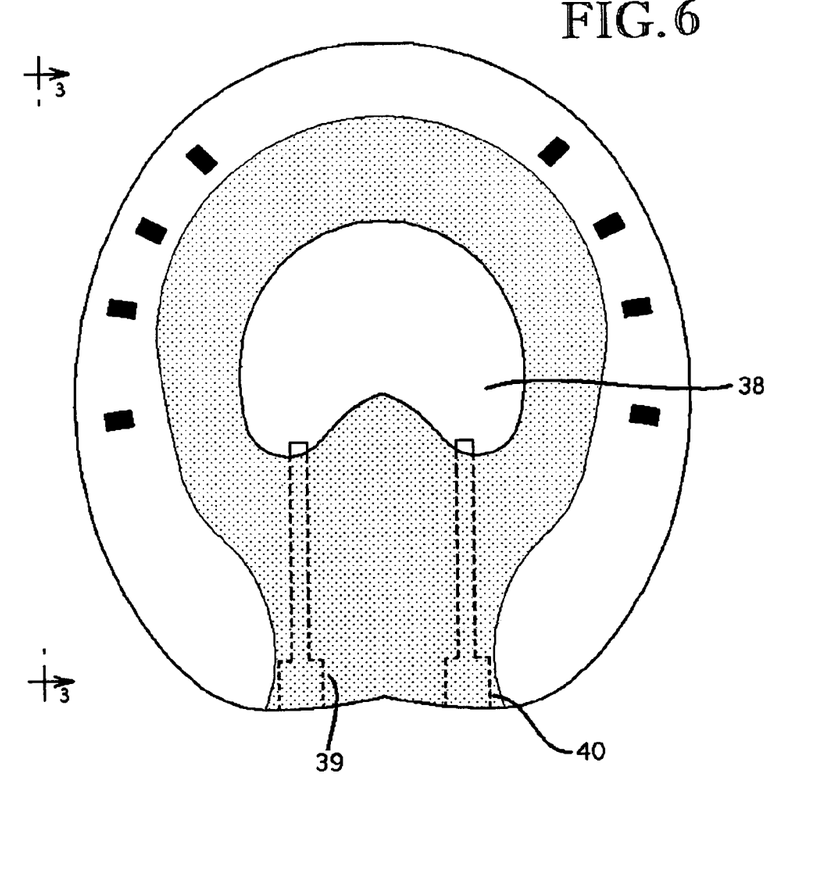
FIG. 6 is a diagram of the one embodiment of the invention in which injection ports are integrated into the shoe such that a liquid packing can be injected into the area between the shoe and the animal's sole.

FIG. 5 shows the optional material side-flaps 34 that emerge from the softer material 35 (or are trapped between softer 35 and harder 36 materials) and then would lay across the top surface of the shoe, and finally be glued to the side wall of the horse's hoof. These help with the glue attachment to the foot. The material used is chosen for flexibility and strength so that repeated flexing will not cause the material to fail over the expected life of the shoe (4 to 8 weeks). An important feature of the present invention is the attachment of these fabric flaps to an interior part of the shoe and not at the outer edge. The present design allows the outer periphery of the shoe 37 to be grinded as needed to make it fit any horse's hoof FIG. 6 shows details of the "injection ports". This design provides an easy means to apply an injectable packing material onto the sole and into various crevasses within the sole, and between the hoof and shoe.

It is intended that the present invention not be limited to the particular embodiment illustrated herein, but embraces all such modified forms thereof as come within the scope of the following exemplary claims.

What is claimed is:

1. A horse shoe, comprising:
   a first part for coupling to a bottom of a horse's hoof, the first part being formed from a material exhibiting a first amount of resiliency, the first part having a hoof facing side and a ground facing side, said hoof facing side having an interior edge, a recess and a peripheral edge; and
   a second part disposed in said recess extending from the hoof facing side of said first part to overlie a sole portion of the horse's hoof, the second part being formed from a material exhibiting a second amount of resiliency, wherein the second amount of resiliency is greater than the first amount of resiliency, the second part disposed between the hoof facing side of said first part and the hoof such that said second part is coextensive with said interior edge of said first part, only a portion of said second part extending from said interior edge to said peripheral edge of said first part and said second part not extending to said ground facing side.

2. The horse shoe of claim 1, wherein the second part overlies at least a frog portion of the sole of the horse's hoof such that it provides support to a caudal portion of the horse's hoof when in use.

3. The horse shoe of claim 1, wherein the first part is harder to give structural strength for nail-retention, and the second part is softer to lessen pressure points on the sole portion of the horse's foot.

4. The horse shoe of claim 1, wherein the first and second parts are made from different types of plastic, the type of plastic of the first part having a higher durometer than the type of plastic of the second part.

5. The horse shoe of claim 1, wherein the first and second parts are made from the same type of material, the differing resiliency of the first and second parts being obtained through geometric shaping of the respective parts.

6. The horse shoe of claim 5, wherein the second part of the shoe includes a plurality of voids in the material so that it deforms more easily and has higher resiliency than the first part.

7. The horse shoe of claim 1, wherein the second part is sized and shaped to extend at least partially over a heel portion of the horse's hoof when in use.

8. The horse shoe of claim 1, further comprising a plurality of stand-offs on a sole-side of the first part for holding the shoe a distance from the horse's hoof while gluing such that a substantially uniform thickness of glue between the hoof and the shoe is obtained.

9. The horse shoe of claim 1, further comprising an aperture extending through the at least the second part to provide air flow to the sole portion of the horse's hoof when in use.

* * * * *